United States Patent [19]

van der Weide

[11] Patent Number: 4,489,700
[45] Date of Patent: Dec. 25, 1984

[54] METHOD FOR SUPPLYING AN INTERNAL COMBUSTION ENGINE WITH FUEL AND A FUEL SUPPLY SYSTEM FOR PERFORMING THE METHOD

[75] Inventor: Jouke van der Weide, Rijswijk, Netherlands

[73] Assignee: Robert Bosch GmbH, Stuttgart, Fed. Rep. of Germany

[21] Appl. No.: 420,974

[22] Filed: Sep. 21, 1982

[30] Foreign Application Priority Data

Feb. 11, 1982 [DE] Fed. Rep. of Germany ....... 3204752

[51] Int. Cl.³ ............................................ F02M 39/00
[52] U.S. Cl. .................................. 123/527; 123/454; 123/452; 48/180 R
[58] Field of Search ............... 123/525, 527, 454, 452; 48/180.1

[56] References Cited

U.S. PATENT DOCUMENTS

| 2,821,843 | 2/1958 | Mengelkamp et al. | 123/527 |
| 3,184,295 | 5/1965 | Baverstock | 123/525 |
| 4,391,252 | 7/1983 | Jäggle et al. | 123/454 |

FOREIGN PATENT DOCUMENTS

| 2456856 | 1/1981 | France | 123/525 |

Primary Examiner—Ethel R. Cross
Attorney, Agent, or Firm—Edwin E. Greigg

[57] ABSTRACT

A method for supplying an internal combustion engine with liquefied petroleum gas (LPG) and a fuel supply system for the supplying the LPG into the intake manifold of an internal combustion engine are proposed. The fuel supply system includes a pump, which pumps LPG from an LPG tank at a predetermined pressure above its vapor pressure into a supply line, which leads via a heat exchanger to a metering valve. The metering valve has a metering piston, which is axially displaceable in a guide bore by means of an air flow rate meter and thereby opens a metering opening to a greater or lesser extent. Downstream of the metering valve, the metered LPG quantity flows via a regulating valve and through the heat exchanger, in which it at least partially evaporates and cools the LPG flowing to the metering valve. The supply of the metered LPG may be effected via a nozzle into the intake manifold upstream of a throttle valve. LPG serves as the restoring force exerted on the metering piston, the pressure of the LPG being variable in a control pressure line by means of a pressure control valve for the purpose of adapting the mixture in accordance with operating characteristics of the engine.

32 Claims, 1 Drawing Figure

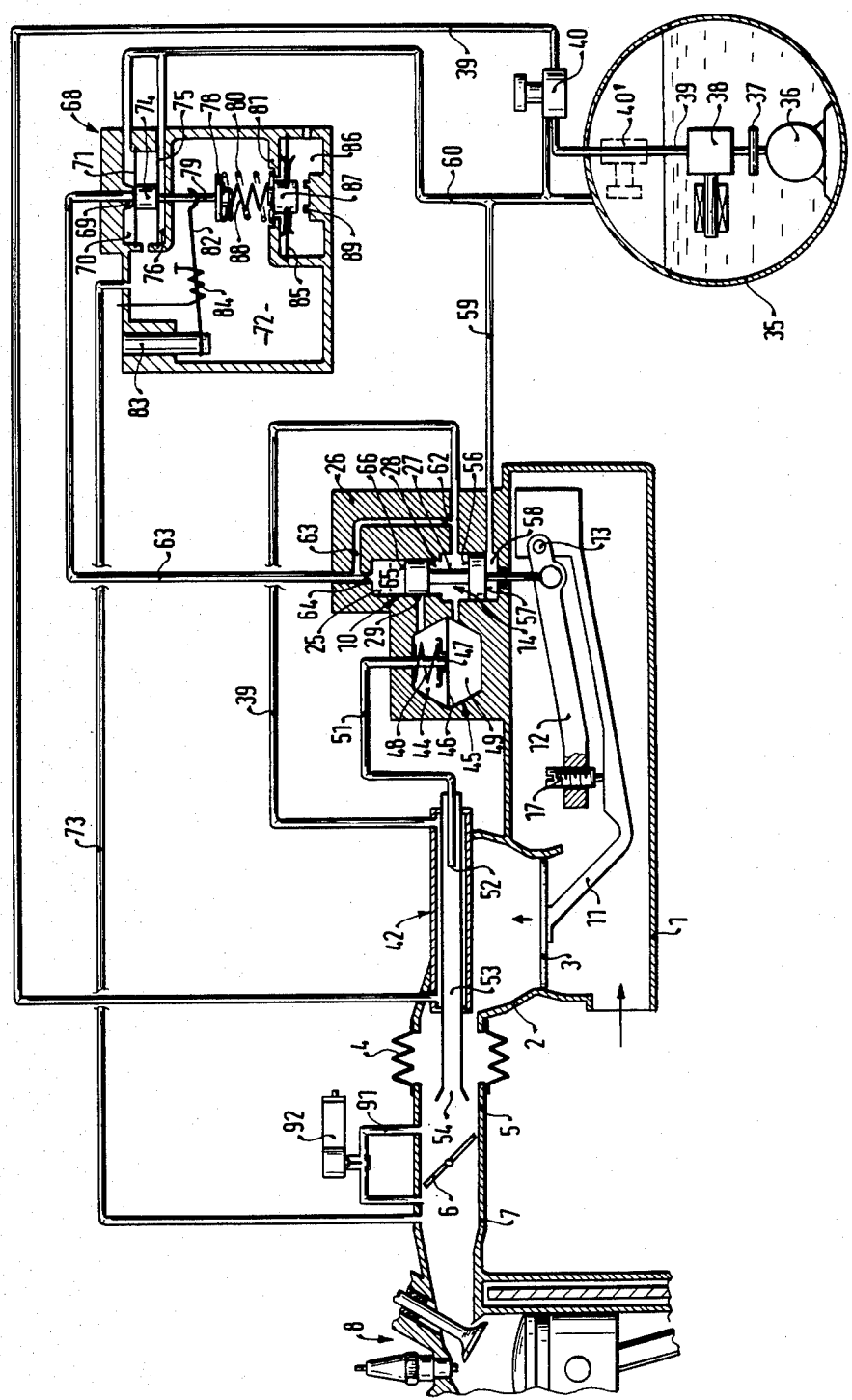

METHOD FOR SUPPLYING AN INTERNAL COMBUSTION ENGINE WITH FUEL AND A FUEL SUPPLY SYSTEM FOR PERFORMING THE METHOD

CROSS-REFERENCE TO RELATED APPLICATION

This application discloses subject matter generally related to the subject matter disclosed in my co-pending application Ser. No. 420,972, filed Sept. 21, 1982, both applications being commonly assigned.

BACKGROUND OF THE INVENTION

The present invention relates to a method for supplying an internal combustion engine with liquefied petroleum gas (LPG) as fuel, and to a fuel supply system for an internal combustion engine which supplies the LPG to the engine.

A fuel supply system for blowing in LPG is already known, in which a metering of the vaporized LPG is effected in accordance with the air throughput in the intake manifold by means of a pressure measurement in a venturi. The pressure in the venturi varies with the square of the flow velocity, so that a desired metering of a quantity of LPG which is at a linear ratio with the aspirated air quantity cannot be made. Also, only a rough adaptation of the LPG-air mixture to the various operating states of the internal combustion engine can be made with the known apparatus, resulting in an increased consumption of LPG, reduced output and unfavorable exhaust gases. In metering the vaporized LPG, the danger also exists that oily components dissolved in the liquid LPG may be deposited as oily residues on the metering valve after the LPG has evaporated and cause errors in metering.

OBJECT AND SUMMARY OF THE INVENTION

It is an object of the present invention to provide a method for supplying an internal combustion engine with LPG according to which the LPG is itself used for cooling purposes, and to a corresponding fuel supply system that is not subject to the disadvantages noted above.

According to the method aspect of the present invention, the pressure of the LPG is maintained above its vapor pressure and is cooled by means of metered LPG. The fuel supply system for achieving the above includes a metering valve, a heat exchanger and a pressure generating assembly. The pressure generating assembly maintains the LPG at a pressure above its vapor pressure upstream of the metering valve. The LPG metered is at least partially evaporated and within the heat exchanger serves to cool the LPG flowing to the upstream side of the metering valve. The two flows are therefore directed in opposition within the heat exchanger.

The method and apparatus according to the present invention have the advantage over the prior art that without first forming vapor bubbles, precise metering of the quantity of LPG is effected in accordance with operating characteristics of the engine, so that with the lowest possible LPG consumption and low toxic emissions, the greatest possible output is attained. It is additionally advantageous that because of the vaporization of the LPG effected in the intake manifold, the aspirated air is cooled; the result is that the cylinders are filled to a greater extent and the mixture has a higher octane value, producing an improvement in output and a reduction in the tendency to knocking.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention in simplified form, and the invention is described in greater detail below.

DESCRIPTION OF THE EXEMPLARY EMBODIMENT

In the fuel supply system for LPG shown in the drawing, the air required for combustion flows downstream of an air filter (not shown) in the direction of the arrow via an intake manifold section 1 into a conical section 2, in which an air flow rate meter 3 is disposed, and further through an elastically deformable section 4 and a section 5 via a throttle valve 6 to an intake manifold section 7. From the intake manifold section 7, the air flows to one or more cylinders 8 of an internal combustion engine, for example a mixture-compressing internal combustion engine, either with externally supplied ignition or with self-ignition. The air flow rate meter 3 is, for example, a baffle valve 3 disposed transversely with respect to the flow direction, which moves within the conical section 2 of the intake manifold in accordance with an approximately linear function, for example, of the quantity of air flowing through the intake manifold. By means of a constant restoring force engaging the air flow rate meter 3 and a constant air pressure prevailing upstream of the air flow rate meter, the pressure prevailing between the air flow rate meter 3 and the throttle valve 6 likewise remains constant. The air flow rate meter 3 controls a metering valve 10. A pivot lever 11 connected with the air flow rate meter transmits the adjusting movement of the air flow rate meter 3. The pivot lever 11 is supported in common with a correction lever 12 on a pivot pin 13, and upon its pivoting movement it actuates a movable valve element, embodied as a metering piston 14, of the metering valve 10. The desired fuel-air mixture can be corrected by a mixture regulating screw 17 disposed between the pivot lever 11 and the correction lever 12.

The metering piston 14 is slidably disposed in a guide bore 25 of the metering valve housing 26 and is provided with an annular groove 27. Remote from the pivot lever 11, the annular groove 27 is limited by an axial limiting surface 28 acting as a control surface, which upon an axial movement of the metering piston 14 opens a metering opening 29 to a greater or lesser extent toward the annular groove 27. The metering opening 29 is embodied in the wall of the guide bore 25, for instance in the form of a slit.

The supply of LPG fuel is effected from an LPG tank 35, which is embodied as a specially constructed pressure container and which, when filled, contains LPG at a pressure of approximately 10 to 15 bar.

By means of a pressure generating assembly in the form of a pump 36, which is preferably disposed in the LPG tank 35, the LPG is pumped via a filter 37 and a blocking valve 38 into a supply line 39. The blocking valve 38 and the filter 37 may likewise be advantageously disposed within the LPG tank 35. The blocking valve 38 interrupts the supply line 39 when the system is shut off. The pump 36 pumps the LPG into the supply line 39 at a pressure, for example, 5 bar above the vapor pressure of the LPG. A pressure regulating assembly 40 in the supply line 39, for example, a pressure regulator of known design, regulates a predetermined pressure in the supply line 39 which, for example, is 4 bar above the vapor pressure. The pressure regulator 40 may be disposed outside the LPG tank 35 or, as indicated by dashed lines at 40′, inside the LPG tank 35. The LPG in the supply line 39 is carried upstream of the metering valve 10 and into a heat exchanger 42, through which it flows countercurrent to the LPG metered at the metering valve 10 and is thus cooled by the metered LPG which is at least partially evaporating.

By means of the pressure regulation above the vapor pressure and the additional cooling in the heat exchanger 42, it is assured that the LPG at the metering valve 10 will remain in the liquid state, even at a higher ambient temperature, and pressure changes caused by changes in speed will not occur in the system caused by changes in speed until the desired evaporation takes place, such pressure differences would otherwise cause an unstable formation of vapor bubbles. The LPG traveling through the supply line 39 into the annular groove 27 of the metering piston 14 is capable of flowing to a greater or lesser extent, depending upon the axial position of the control face 28, via the metering opening 29 into an injection chamber 44 of a regulating valve 45. In this injection chamber 44, a valve seat 47 cooperating with a regulating valve diaphragm 46 and a regulating valve spring 48 urging the regulating valve diaphragm 46 in the opening direction of the regulating valve 45 are disposed. The regulating valve diaphragm 46 divides the injection chamber 44 from a control chamber 49, which communicates with the supply line 39, for example, via the annular groove 27 of the metering piston 14. By means of the regulating valve 45, a constant pressure difference is maintained at the metering opening 29, regardless of the quantity of LPG metered at the metering valve 29. The metered LPG flowing out via the valve seat 47 of the regulating valve 45 passes by way of a connecting line 51 into the heat exchanger 42, where it can flow via an evaporation nozzle 52 into an injection line 53, with at least partial evaporation and simultaneous cooling of the LPG flowing via the supply line 39. By means of the injection line 53, the LPG is carried for example to the intake manifold section 5 and then blown into the intake manifold section 5 via one or more nozzles 54 upstream of the throttle valve 6.

The annular groove 27 of the metering piston 14, remote from the control surface 28, is limited by a limiting surface 56. A compensation step 57 is embodied on the metering piston 14 oriented toward the air flow rate meter 3, and the size of the annular surface of the compensation step 57 is equal to that of the limiting surface 56. The annular surface of the compensation step 57 on one end defines a compensation chamber 58 embodied within the guide bore 25. The chamber 58 communicates via an intersecting line 59 with a return flow line 60 leading to the LPG tank 35. As a result, the vapor pressure of the LPG, which varies with the ambient temperature, is prevented from influencing the position of the metering piston 14.

In order to generate the restoring force exerted on the metering piston 14, and thus on the air flow rate meter 3, LPG is again used. To this end, a control pressure line 63 branches off from the supply line 39 via an uncoupling throttle 62. A pressure chamber 65 communicates via a damping throttle 64 with the control pressure line 63, the pressure chamber being embodied in the guide bore 25 of the metering piston 14, and the metering piston 14 protrudes into this pressure chamber 65 with its end surface 66 remote from the air flow rate meter 3. In order to adapt the LPG-air mixture to operating characteristics of the engine, the pressure in the control pressure line 63 and thus the restoring force exerted on the metering piston 14 and the air flow rate meter 3 are variable. To this end, a pressure control valve 68 is disposed in the control pressure line 63, being triggerable by operating characteristics such as temperature, rpm, throttle valve position, exhaust gas composition, and others and influencing the pressure in the control pressure line 63 in order to adapt the mixture. The pressure control valve 68 may be electromagnetically actuable, or it may be embodied as described by way of example below and shown in the drawing. The pressure control valve 68 is embodied as a flat seat valve, having a fixed valve seat 69 which protrudes into a return flow chamber 70 and by way of which the control pressure line 63 discharges into the return flow chamber 70. A valve diaphragm 71, which separates the return flow chamber 70 from a vacuum chamber 72, cooperates with the fixed valve seat 69 and communicates with a vacuum line 73 leading to the intake manifold section 7 downstream of the throttle valve 6. The valve diaphragm 71 is connected via a coupling member 74 with a compensating diaphragm 75, which divides the vacuum chamber 72 from a compensating chamber 76. Both the return flow chamber 70 and the compensating chamber 76 communicate with the return line 60 leading to the LPG tank 35. The compensating diaphragm 75 serves to compensate for influence of the LPG vapor pressure on the valve diaphragm 71. To this end, it is necessary for the valve surface of the valve diaphragm 71 oriented toward the return flow chamber 70 to be of equal size with the face of the compensating diaphragm 75 oriented toward the compensating chamber 76; the diaphragm surfaces oriented toward the vacuum chamber 72 should likewise be of equal size. In a closing direction of the pressure control valve 68 a valve spring 80 communicates with the valve membrane 71 via a spring disk 78, a valve pin 79 and the coupling element 74. The valve spring 80 is displaced between the spring disc 78 and means supported by a fixed housing element 81.

At temperatures below an engine operating temperature of approximately 80° C., the closing force transmitted onto the pressure control valve 68 by the valve pin 79 can act counter to an element which functions in accordance with temperature and takes the form of a bimetallic spring 82, one end of which rests on the spring disk 78 during the warmup phase of the engine, and the other end of which is secured to a bolt 83 pressed into the housing of the pressure control valve 68. An electrical heating element 84 may be mounted on the bimetallic spring 82 and supplied with current beginning with engine ignition. The pressure control valve 68 furthermore has a control diaphragm 85, which separates the vacuum chamber 72 from an atmospheric chamber 86 in which atmospheric pressure prevails. The control diaphragm 85 is engaged by a spring plate 87 on which one end of a control spring 88 is supported. The other end of the control spring 88 engages the spring plate 78. The control spring 88 extends parallel to and is coaxial with the valve spring 80.

Movement of the control diaphragm 85 is limitable in that the spring plate 87 can come to rest on contact 81 in one movement direction and on a stop 89 in the opposite movement direction.

The mode of operation of the system is as follows:

Upon starting of the engine, the blocking valve 38 is opened and the LPG is pumped to the metering valve 10 by means of the pump 36 by way of the supply line 39 and the heat exchanger 42. Upon starting, the engine aspirates air via the intake manifold 1, by means of which the air flow rate meter 3 undergoes a certain deflection out of its position of rest. In accordance with the deflection of the air flow rate meter 3, the metering piston 14 is displaced as well via the lever 11. The control surface 28 of the metering piston 4 opens the metering opening 29 to a greater or lesser extent toward the annular groove 27 in accordance with the position of the metering piston 14, so that an LPG quantity is metered at the metering valve in accordance with the aspirated air quantity ascertained by the air flow meter 3, and this quantity of LPG is carried by means of the injection line 53, for example to intake manifold section 5, and is blown into the intake manifold section 5 by way of one or more nozzles 54 upstream of the throttle valve 6. In order to control a larger quantity of mixture during engine warmup, a bypass 91 which bypasses the throttle valve 6 is provided at the intake manifold sections 5, 7; the cross section of the bypass 91 is controlled in accordance with temperature in a known manner by a supplementary mixture valve 92 during the warmup phase of the engine.

The direct connection between the air flow rate meter 3 and the metering piston 14 effects a predetermined ratio between the aspirated quantity and the metered LPG quantity. In order to attain a further enrichment of the mixture supplied to the engine during the warmup phase of the engine, a lesser pressure can be controlled by the pressure control valve 68 in the pressure chamber 65, so that the restoring force exerted on the air flow rate meter 3 and the metering piston 14 is reduced, and a larger quantity of LPG is metered and blown into the intake manifold by way of the nozzle 54. To this end, the spring plate 78 of the pressure control valve 68 is engaged by the bimetallic spring 82 during the warmup phase of the engine such that the valve spring 80 and the control spring 88 are relieved, and the valve diaphragm 71 lifts to a greater extent from the valve seat 69. As a result the pressure in the control pressure line 63 and in the pressure chamber 65 decreases.

After the warmup phase of the engine has elapsed, that is, after the bimetallic spring 82 has been heated by the electrical heating element 84, the bimetallic spring 82 bends away from the spring plate 78 and is disengaged from the spring plate 78 so that the spring forces of the valve spring 80 and the control spring 88 become fully effective, and a higher pressure results in the control pressure line 63. This causes a leaning down of the mixture supplied to the engine. A leaning of the mixture of this kind is desirable when the engine is being operated in the partial-load range. In the partial-load range of the engine, the vacuum in the intake tube section 7 and thus, via the vacuum line 73 in the vacuum chamber 72 of the pressure control valve 68 is so great that the pressure force of the atmospheric air in the atmospheric chamber 86 is sufficient to cause the control diaphragm 85 to come to rest on the fixed housing element 81, counter to the force of the control spring 88. Now if at full load the vacuum drops or the absolute pressure in the intake manifold 7 downstream of the throttle valve 6 increases, then an increased absolute pressure also becomes effective in the vacuum chamber 72 via the vacuum line 73. This greater absolute pressure, engaging the control diaphragm 85, moves the diaphragm 85 toward the stop 89, thus relieving the control spring 88, and the valve diaphragm 71 opens the valve seat 69 to a greater extent so that the pressure in the control pressure line 63 and in the pressure chamber 65 is reduced. This causes an enrichment of the mixture by way of an increased metered quantity of LPG. In the same manner, if there is a sudden acceleration of the engine, the sudden opening of the throttle valve 6 effects a pressure increase in the vacuum line 73, which causes an enrichment of the mixture just as is the case at full load.

The foregoing relates to a preferred exemplary embodiment of the invention, it being understood that other embodiments and variants thereof are possible within the spirit and scope of the invention, the latter being defined by the appended claims.

What is claimed and desired to be secured by letters patent of the United States is:

1. A method for supplying an internal combustion engine with fuel by means of a fuel supply system having a fuel supply line, a fuel metering valve disposed in the fuel supply line for metering a quantity of fuel as a function of operating characteristics of the engine, and a heat exchanger disposed in the fuel supply line, comprising the steps of:
    providing the system with LPG as fuel;
    maintaining the pressure of the LPG above its vapor pressure upstream of the metering valve; and
    cooling the LPG upstream of the metering valve in the heat exchanger by means of the LPG metered at the fuel metering valve, which is at least partially evaporated downstream of the metering valve.

2. The method as defined in claim 1, wherein the LPG flows through the heat exchanger in a direction opposite to the direction of flow of the metered LPG.

3. The method as defined in claim 1, wherein the fuel supply system further has a pressure generating assembly, and wherein the LPG is maintained at a pressure above its vapor pressure by the pressure generating assembly.

4. The method as defined in claim 3, wherein the fuel supply system further has an LPG tank, and wherein the method further comprises the step of:
    disposing the pressure generating assembly within the LPG tank.

5. The method as defined in claim 3 or 4, wherein the fuel supply system further has a pressure regulating system, and wherein the method further comprises the step of:
    disposing the pressure regulating system downstream of the pressure generating system, said pressure regulating system regulating the pressure of the LPG to a predetermined pressure above the vapor pressure of the LPG.

6. The method as defined in claim 1, wherein the fuel supply system further has an air flow rate meter responding to the aspirated air quantity drawn into the engine, said fuel metering valve including a movable valve element, and wherein the method further comprises the steps of:
    applying a restoring force to the movable valve element; and applying a further force to the movable valve element via the air flow rate meter, counter to the restoring force, whereby the position of said movable valve element is determined by the resultant of the two forces.

7. The method as defined in claim 6, further comprising the step of:
providing a metering piston for the movable valve element.

8. The method as defined in claim 7, wherein the fuel supply system further has a guide bore within which the metering piston is guided, and a metering opening provided within the wall of the guide bore, and wherein the method further comprises the step of:
opening the metering opening to a greater or lesser extent with the metering piston.

9. The method as defined in claim 8, wherein the metering piston is guided within the guide bore in an axially displaceable manner.

10. The method as defined in claim 9, wherein the metering piston defines an annular groove and includes an axial limiting surface which partly defines the annular groove, and wherein the method further comprises the step of:
controlling the opening of said metering opening with said axial limiting surface.

11. The method as defined in claim 10, wherein the fuel supply system further has: a control chamber; a movable wall; and a regulating valve including an injection chamber separated from the control chamber by said movable wall; a valve seat cooperating with the movable wall and a regulating valve spring urging the movable wall in the opening direction of the regulating valve, and wherein the method further comprises the step of:
causing the pressure of the LPG upstream of the metering opening to prevail in the control chamber.

12. The method as defined in claim 10, wherein the fuel supply system further has an LPG tank, the metering piston further defines a further axial limiting surface and an annular compensating surface equal in size to the further axial limiting surface, said compensating surface partly defining a compensating chamber, and wherein the method further comprises the steps of:
causing the compensating chamber to communicate with the LPG tank.

13. The method as defined in claim 12, wherein the fuel supply system further has at least one pressure control valve and the LPG serves to generate the restoring force at the metering piston, and wherein the method further comprises the step of:
varying the pressure of the LPG as a function of operating characteristics of the engine by said at least one pressure control valve.

14. The method as defined in claim 13, wherein the fuel supply system further has a pressure chamber, an LPG supply line, a control pressure line and an uncoupling throttle, wherein the metering piston further defines an end surface remote from the compensating surface, and wherein the method further comprises the steps of:
moving the metering piston into said pressure chamber such that its end surface remote from its compensating surface is acted upon by the pressure in said pressure chamber thereby producing the restoring force;

causing the pressure chamber to communicate with the LPG supply line by the control pressure line; and limiting one end of the control pressure line by said uncoupling throttle, and the other end by said pressure control valve.

15. The method as defined in claim 14, wherein the fuel supply system further has an intake manifold within which a throttle valve is mounted, and a vacuum line connected to the intake manifold downstream of the throttle valve, wherein the pressure control valve defines a vacuum chamber, a return flow chamber and a compensating chamber, and includes: a valve diaphragm which divides the vacuum chamber from the return flow chamber, said return flow chamber being connected to the control pressure line; a coupling member connected to the compensating diaphragm, said compensating diaphragm dividing the compensating chamber from the vacuum chamber, said compensating chamber communicating with the LPG tank, and said control pressure line being connected with the compensating diaphragm via the coupling member; a valve spring disposed in the vacuum chamber and biasing the valve diaphragm toward the valve seat; and a temperature functioning element, and wherein the method further comprises the step of:
reducing the magnitude of the biasing force exerted by the valve spring against the valve diaphragm, at temperatures below the engine operating temperature, by means of the temperature functioning element.

16. The method as defined in claim 15, wherein the pressure control valve further includes: a control spring which also biases the valve diaphragm toward the valve seat; and a control diaphragm which engages the control spring, and wherein the method further comprises the step of:
subjecting the control diaphragm on one side to the pressure in the vacuum chamber, and on the other side to atmospheric pressure.

17. The method as defined in claim 16, wherein the pressure control valve further includes: stop means, and wherein the method further comprises the steps of:
reducing the magnitude of the biasing force exerted by the control spring against the valve diaphragm by means of the control diaphragm when the intake manifold pressure reaches a predetermined level; and limiting the movement of the control diaphragm, during reduction of the magnitude of the biasing force exerted by the control spring, by said stop means.

18. A fuel supply system for supplying LPG into the intake manifold of an internal combustion engine, comprising:
a supply line;
a metering valve disposed in the supply line for metering a quantity of LPG as a function of operating characteristics of the engine;
a pressure generating assembly connected to the supply line upstream of the metering valve for maintaining the LPG at a pressure above its vapor pressure upstream of the metering valve;
a heat exchanger through which the LPG flows to the metering valve, with one end of the heat exchanger being connected to the downstream side of the metering valve, and the LPG metered at the metering valve likewise flows through the heat exchanger.

19. The fuel supply system as defined in claim 18, wherein the LPG metered by the metering valve flows through the heat exchanger opposite in direction to the LPG flowing to the metering valve, said LPG flowing to the metering valve surrounding the metered LPG through the heat exchanger.

20. The fuel supply system as defined in claim 19, further comprising:
a pressure regulating assembly connected to the supply line downstream of the pressure generating assembly, for regulating the pressure of the LPG to a predetermined pressure above the vapor pressure of the LPG.

21. The fuel supply system as defined in claim 18 or 19, further comprising:
an air flow rate meter which is displaceable by the quantity of aspirated air in the intake manifold, wherein the metering valve includes a movable valve element and means for applying a restoring force to the valve element, and wherein the air flow rate meter engages the movable valve element and applies a force counter to that applied by the restoring force.

22. The fuel supply system as defined in claim 21, wherein the movable valve element comprises a metering piston.

23. The fuel supply system as defined in claim 22, wherein the metering valve further includes a guide bore within which the metering piston is guided, and a metering opening provided in the wall of the guide bore, said metering opening being opened to a greater of lesser extent by the metering piston.

24. The fuel supply system as defined in claim 23, wherein the metering piston is supported in the guide bore in an axially displaceable manner.

25. The fuel supply system as defined in claim 24, wherein the metering piston defines an annular groove and an axial limiting surface at one end of the annular groove, said axial limiting surface cooperating with the metering opening and thereby serving as a control surface.

26. The fuel supply system as defined in claim 25, further comprising:
a control chamber subject to the pressure of the LPG upstream of the metering opening;
a movable wall; and
a regulating valve including an injection chamber separated from the control chamber by said movable wall, a valve seat cooperating with the movable wall; and a regulating valve spring urging the movable wall in the opening direction of the regulating valve.

27. The fuel supply system as defined in claim 25, further comprising:
an LPG tank, wherein the metering piston further defines a further axial limiting surface and an annular compensating surface equal in size to the further axial limiting surface, said compensating surface partly defining a compensating chamber which communicates with the LPG tank.

28. The fuel supply system as defined in claim 27, further comprising:
at least one pressure control valve which varies the pressure of the LPG in accordance with operating characteristics of the engine, wherein the means for applying a restoring force to the valve element includes the LPG which generates a restoring force at the metering piston.

29. The fuel supply system as defined in claim 28, further comprising:
a pressure chamber;
a control pressure line which communicates with the supply line, and
an uncoupling throttle wherein the pressure generating assembly includes a pressure control valve, and wherein one end of said control pressure line is limited by the uncoupling throttle and the other end by the pressure control valve, and the metering piston further defines an end surface remote from the compensating surface which extends into said pressure chamber, said pressure chamber communicating with the control pressure line.

30. The fuel supply system as defined in claim 29, further comprising:
an intake manifold within which a throttle valve is mounted;
a vacuum line connected to the intake manifold downstream of the throttle valve, wherein the pressure control valve defines a vacuum chamber, a return flow chamber and a compensating chamber, said pressure control valve including:
a valve diaphragm which divides the vacuum chamber from the return flow chamber, said return flow chamber being connected to the LPG tank and said vacuum chamber communicating with the vacuum line;
means protruding into the vacuum chamber and defining a valve seat which cooperates with the valve diaphragm, said means defining said valve seat being connected to the control pressure line;
a coupling member connected to the compensating diaphragm, said compensating diaphragm dividing the compensating chamber from the vacuum chamber, said compensating chamber communicating with the LPG tank, and said control pressure line being connected with the compensating diaphragm via the coupling member;
a valve spring disposed in the vacuum chamber and biasing the valve diaphragm toward the valve seat; and
a temperature functioning element which, at temperatures below the engine operating temperature, reduces the magnitude of the biasing force exerted by the valve spring against the valve diaphragm.

31. The fuel supply system as defined in claim 30, wherein the pressure control valve further includes:
a control spring which also biases the valve diaphragm toward the valve seat; and
a control diaphragm which engages the control spring, one side of said control diaphragm being exposed to the pressure in the vacuum chamber and the other side of said control diaphragm being exposed to atmospheric pressure.

32. The fuel supply system as defined in calim 31, wherein the pressure control valve further includes:
stop means for limiting the movement of the control diaphragm during reduction of the magnitude of the biasing force exerted by the control spring, said control diaphragm producing said reduction when the intake manifold pressure reaches a predetermined level.

* * * * *